United States Patent
Poujoulat et al.

(10) Patent No.: US 6,529,974 B1
(45) Date of Patent: Mar. 4, 2003

(54) METHOD FOR EXCHANGING DIGITAL DATA BETWEEN ELECTRONIC CARDS AND CORRESPONDING CONNECTION SYSTEM

(75) Inventors: Marc Poujoulat, Montbonnot (FR); Guy Henri Poujoulat, Grenoble (FR)

(73) Assignee: Societe d'Applications Industrielles des Microprocesseurs, Meylan (FR)

( * ) Notice: Subject to any disclaimer, the term of this patent is extended or adjusted under 35 U.S.C. 154(b) by 0 days.

(21) Appl. No.: 09/319,281
(22) PCT Filed: Dec. 4, 1997
(86) PCT No.: PCT/FR97/02206
§ 371 (c)(1),
(2), (4) Date: Jun. 3, 1999
(87) PCT Pub. No.: WO98/25209
PCT Pub. Date: Jun. 11, 1998

(30) Foreign Application Priority Data

Dec. 5, 1996 (FR) .............................................. 96 14938

(51) Int. Cl.[7] ........................ G06F 3/00; G06F 13/00; H05K 7/10
(52) U.S. Cl. .......................................... 710/61; 710/301
(58) Field of Search ..................... 439/61, 62; 361/788; 710/61, 301; 713/400, 500, 600

(56) References Cited

U.S. PATENT DOCUMENTS 4,050,097 A 9/1977 Miu et al.
4,697,858 A 10/1987 Balakrishnan

*Primary Examiner*—Peter Wong
*Assistant Examiner*—Tim Vo
(74) *Attorney, Agent, or Firm*—Smith, Gambrell & Russell, LLP

(57) ABSTRACT

The connection system between electronic cards comprises at least a base card (CB) comprising a printed circuit having a set of tracks for transferring electric signals, at least two base connectors (CO2–CO5) connected on said set of tracks and each capable of removably receiving one of said electronic cards, means for amplifying signals connected on the printed circuit, and individual means of electricity supply connected on the printed circuit and capable of supplying the amplifying means and said electronic cards.

31 Claims, 11 Drawing Sheets

Figure 1:
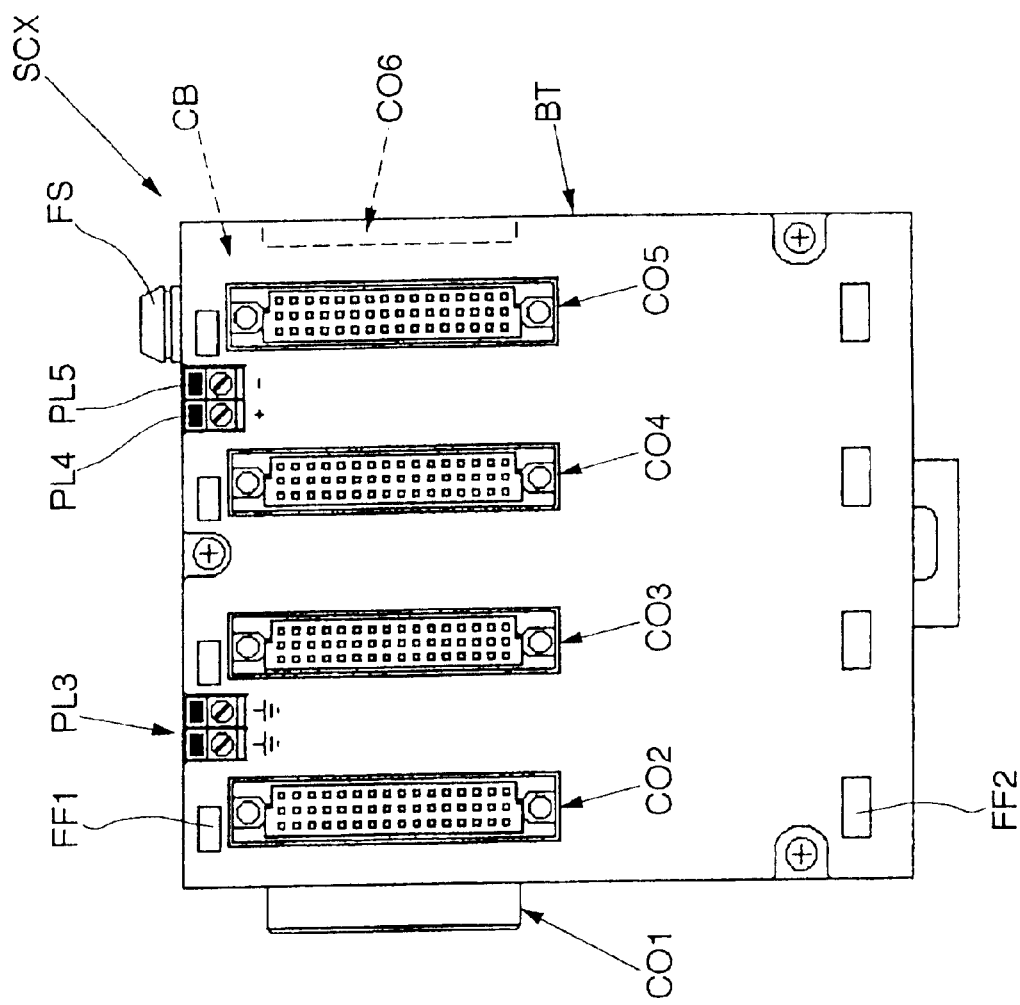

METHOD FOR EXCHANGING DIGITAL DATA BETWEEN ELECTRONIC CARDS AND CORRESPONDING CONNECTION SYSTEM

The invention relates to the connection and exchange of digital information between electronic cards.

The invention applies advantageously but not limitingly to the so-called "backplane" connection facility providing for the use of connection cards referred to as "backplane cards" installed in racks and on which are connected electronic cards comprising various components as a function of their application, such as microprocessors, for example.

At present, backplane cards are exclusively passive in the sense that they comprise only the connection facility proper and impedance matching means.

Furthermore, when for a particular rig, a user has defined a certain electronic configuration providing for a certain number of electronic cards to be connected together, he chooses a backplane card having sufficient connection areas to be able to connect the number of electronic cards which he envisaged at the outset. Moreover, he must also dimension the supply means of these electronic cards as a function of their initially envisaged number.

If for any reason the user has to increase the number of cards in his configuration, it is not possible for him to extend his backplane without having to modify everything and has furthermore to redimension the supply means.

Moreover, when these backplane cards form the hardware support for a digital linking bus conveying digital information between the electronic cards, the number of signals to be processed requires that complex decoding circuits, which are sometimes specific and which are often expensive, be installed on the electronic cards connected on the backplane card.

Finally, the need for these backplane cards to meet the constraints of electromagnetic immunity requires expensive solutions.

The invention aims to afford a solution to these problems.

The invention therefore proposes a process for exchanging digital information between electronic cards, in which the electronic cards are removably connected on at least one base card (or backplane card) comprising its own individual supply means connected on a printed circuit possessing a set of tracks for the flow of electrical signals able to convey the said information, and certain at least of the electrical signals flowing, on this base card, between the connection areas of the electronic cards are amplified directly on the base card.

The base card is therefore an active card insofar as it possesses its own individual amplification means comprising amplification barriers proper based on flip-flops or buffer memories and logic functions building in amplification, for example programmable logic circuits (or Programmable Array Logic).

Furthermore, this backplane card builds in its own individual supply which is dimensioned in such a way as to be able to supply the maximum number of electronic cards which can be connected on this base card. Whereas in theory a minimum of two electronic cards is connected on a base card, it is in practice possible to connect more than two, for example four, on equidistant connection areas.

To obtain a modular backplane, at least one other base card of similar structure can be connected on the base card. Thus, the user can add the base cards alongside one another so as to produce the configuration which he desires. If his configuration must alter over time, he can always add or remove one or more base cards. Furthermore, since each base card builds in a supply sufficient to supply the electronic cards which it can receive, it is not necessary to redimension a new specific supply, since the new base card also builds in its own individual supply. This further contributes to the perfect modularity of the backplane according to the invention.

Moreover, a connection of the base cards one on another is advantageously envisaged so that all the connection areas of the electronic cards, situated on the set of base cards, are equidistant. Thus, the general appearance of an electronic configuration composed of several electronic cards connected on several base cards, remains homogeneous.

Independently or not of the characteristics just alluded to, relating in particular to supply and to amplification, the process according to the invention advantageously provides for the said set of tracks of each base card to form a hardware support for a digital bus on which are conveyed, synchronously, data logic signals, address logic signals, as well as monitoring logic signals, with the exclusion of any clock logic signal such as is conventionally present in the digital buses known from the prior art. The absence of any clock signal conveyed on the bus contributes to assisting the electromagnetic immunity of the card conveying the bus, since the presence of numerous rising edges existing in a clock signal, especially at high frequency, is thus avoided. It then becomes possible to use simple means to obtain this immunity. Moreover, by providing a synchronous bus it becomes possible to obtain predetermined cycle times, this offering the advantage of being able to determine the duration of the various processing operations in advance.

Generally, when an exchange of information is envisaged between a so-called "master" electronic card, comprising an input/output port linked to a processing unit such as a processor, and at least one so-called "slave" electronic card, addressable by the processing unit, an address cue comprising a first address indication (for example a certain number of high-order bits of the address) making it possible to locate the slave card on the bus as well as a second address indication (low-order bits) defining an addressing space within the slave card, is associated with every slave card. The process according to the invention advantageously comprises at least write access cycles and read access cycles, in the course of which the following are conveyed in the guise of monitoring logic signals; an access logic signal representative of an access or non-access in read or write mode to the bus, an enabling logic signal allowing in particular enabling of the second address indications, this enabling logic signal being active at the high logic level throughout the duration of write or read access, and a selection logic signal activated by the slave card having recognized its address cue.

The process can furthermore comprise a step of resetting the slave cards, this reset step being performed in the presence of a reset logic signal emitted by the master card.

In order to ensure interoperability of the electronic cards which can be connected on one or more base cards, there is advantageously provision for the process according to the invention to be able to comprise automatic recognition of the electronic cards connected on the digital bus. Thus, this automatic recognition exonerates the user from the conventional manual and mechanical operations consisting in positioning jumpers on the electronic cards connected on the bus so as to contrive their first address indication mechanically.

More precisely, according to one mode of implementation of the process, an identifier representative of a card type chosen from among predefined types is stored in certain at least of the slave cards and provision is made for a step of automatic identification by the master card, of the type of each slave card connected on a base card, as well as a step of automatic assignment by the master card to each identified slave card of its first address indication making it possible to locate it on the bus.

In practice, a slave card intended to be identified automatically is equipped with an internal logic unit able to deliver in series a predetermined number of bits forming the said identifier. After the reset step, this slave card advantageously then sequentially transmits toward the master card the bits of its identifier by using the selection logic signal, and the master card then transmits to the slave card a predetermined number of address bits constituting the said first address indication.

When several slave cards are connected in parallel on one or more base cards, the master card advantageously identifies and addresses the slave cards sequentially in a pre-established order.

According to a preferred mode of implementation of the process according to the invention, each slave card intended to be identified automatically is equipped with an initialization input able to receive an initialization input logic signal, and with an initialization output able to deliver an initialization output logic signal. The initialization input of the first slave card is linked to the master card, and the initialization output of each slave card is linked to the initialization input of the next slave card in the said pre-established order. A card receiving an inactive initialization input logic signal then ignores any cue flowing on the bus. At the termination of the reset step, the initialization output logic signals of all the slave cards are inactive while only the initialization input logic signal of the first slave card is active. At the termination of the identification step and of the address assignment step relating to a current slave card, the initialization output logic signal delivered by this card becomes active then allowing the identification and address assignment of the next slave card.

The process can also comprise a step of transferring information between the master card and a slave card according to a so-called "direct memory access" mode controlled by three logic signals managed by the master card.

For all the modes of implementation of the process which have just been mentioned, it is particularly advantageous to control the clock inputs of the address decoding logic circuits installed on the slave cards directly on the rising edges of the enabling logic signal. Thus, programmable logic circuits with registers can be used directly and it is thus possible to minimize the number of components required on the electronic cards connected on the base cards.

When furthermore provision is made for exchanging information between a master electronic card comprising an input/output port linked to a master processing unit such as a master processor and at least one slave electronic card addressable by the processing unit and linked to a slave processing unit such as a slave processor, the master card can be permitted to send simultaneous requests to several slave cards but to receive a cue originating from only one slave card at a time. The mutual exclusion of the slave cards as regards the sending of their cues to the master card is then advantageously managed within management logic means installed directly on the slave cards.

These management logic means may comprise a programmable logic circuit, the clock input of which is controlled on the falling edge of the enabling logic signal in the presence of predetermined conditions.

The subject of the invention is also a system for connection between electronic cards, comprising at least one base card (or backplane card) comprising a printed circuit possessing a set of tracks for transferring electrical signals, at least two base connectors connected on the said set of tracks and each able removably to receive one of the said electronic cards, signal amplification means connected on the printed circuit, and individual electrical supply means connected on the printed circuit and able to supply the amplification means and the said electronic cards.

According to an advantageous embodiment, the base card comprises more than two base connectors, and preferably four, all connected in parallel on the said set of tracks, the amplification means being arranged between two of the base connectors.

In order to assist with the modularity of the backplane, the base card advantageously furthermore comprises first and second complementary extension connectors connected on the said set of tracks and arranged on either side of the amplification means. The first extension connector of the base card is able to cooperate removably with a second extension connector on another base card while the second extension connector of the base card is able to cooperate removably with a first extension connector of another base card.

According to one embodiment of the invention, the two extension connectors are arranged transversely in the vicinity of two opposite ends of the base card.

The base card preferably comprises at the level of the tracks of the printed circuit groups of transverse rows of connection holes, each group being able to receive pins of a base connector or extension connector. The transverse rows of one and the same group being mutually spaced longitudinally by a distance equal to an integer multiple of a predetermined spacing pitch. Two adjacent rows belonging respectively to two neighboring groups assigned to two base connectors are spaced apart by an integer multiple of the said spacing pitch while two adjacent rows belonging to two neighboring groups respectively assigned to a base connector and to an extension connector are spaced apart by a distance equal to one and a half times the spacing pitch.

Such an arrangement of the connection holes on the base cards makes it possible, on the one hand, to obtain an equidistance between the base connectors of each base card and, on the other hand, an equidistance between all the base connectors of several base cards assembled together by way of their extension connectors.

The printed circuit is a double-faced circuit, the set of tracks, the connectors and the amplification means advantageously being situated exclusively on one of the faces while the other face comprises other so-called "ground" tracks forming a ground plane, this promoting the electromagnetic immunization of the cards.

According to one embodiment of the invention, the amplification means comprise a first bidirectional amplification circuit able to amplify the data signals and a part of the address signals of the bus, and possessing a control input terminal for defining the direction of travel of the signals through this first circuit. The amplification means also comprise a bidirectional programmable logic circuit able to amplify a part of the control signals and an output terminal of which is linked to the control input terminal of the first amplification circuit. The amplification means finally comprise a second amplification circuit functioning in monodirectional mode able to amplify another part of the address signals and the remaining control signals. These three circuits are arranged on the same face of the printed circuit and the programmable logic circuit is arranged between the first bidirectional amplification circuit and the second monodirectional amplification circuit.

This mechanical and logic layout of the amplification means makes it possible both to obtain a double-faced printed circuit on the base cards and on the electronic cards intended to be connected therewith, it being possible for the other face of the printed circuit of these cards to be assigned to a ground plane.

Figure 2:
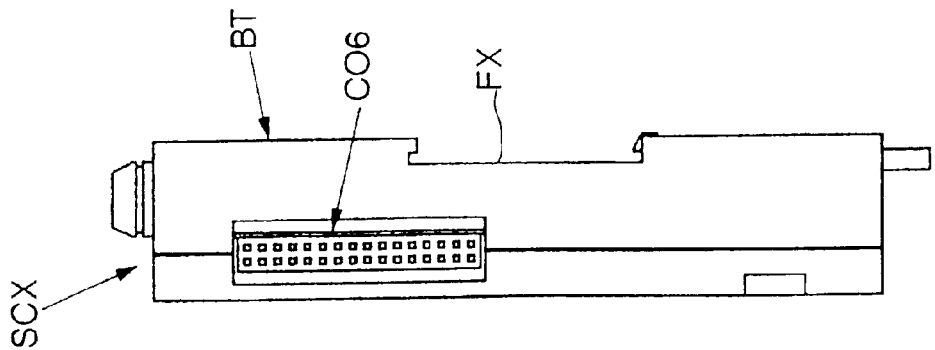
Figure 3:
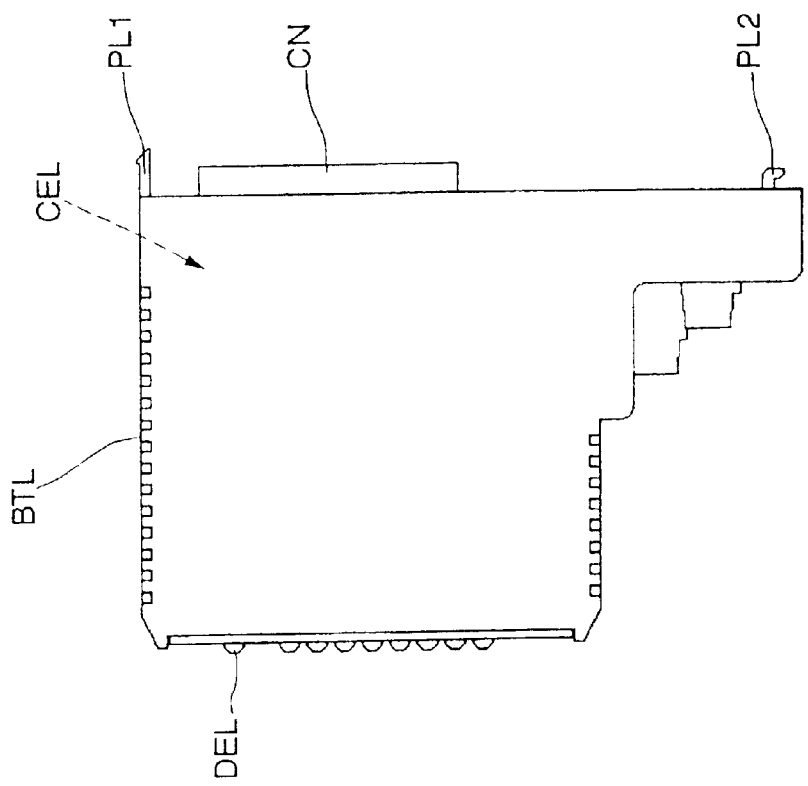
Figure 4:
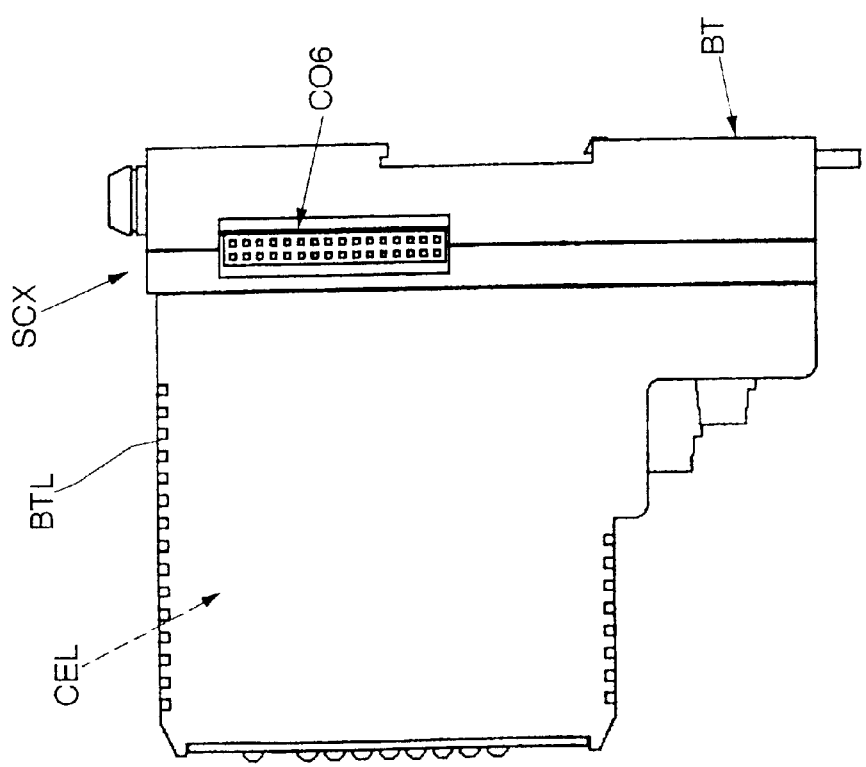
Figure 5:
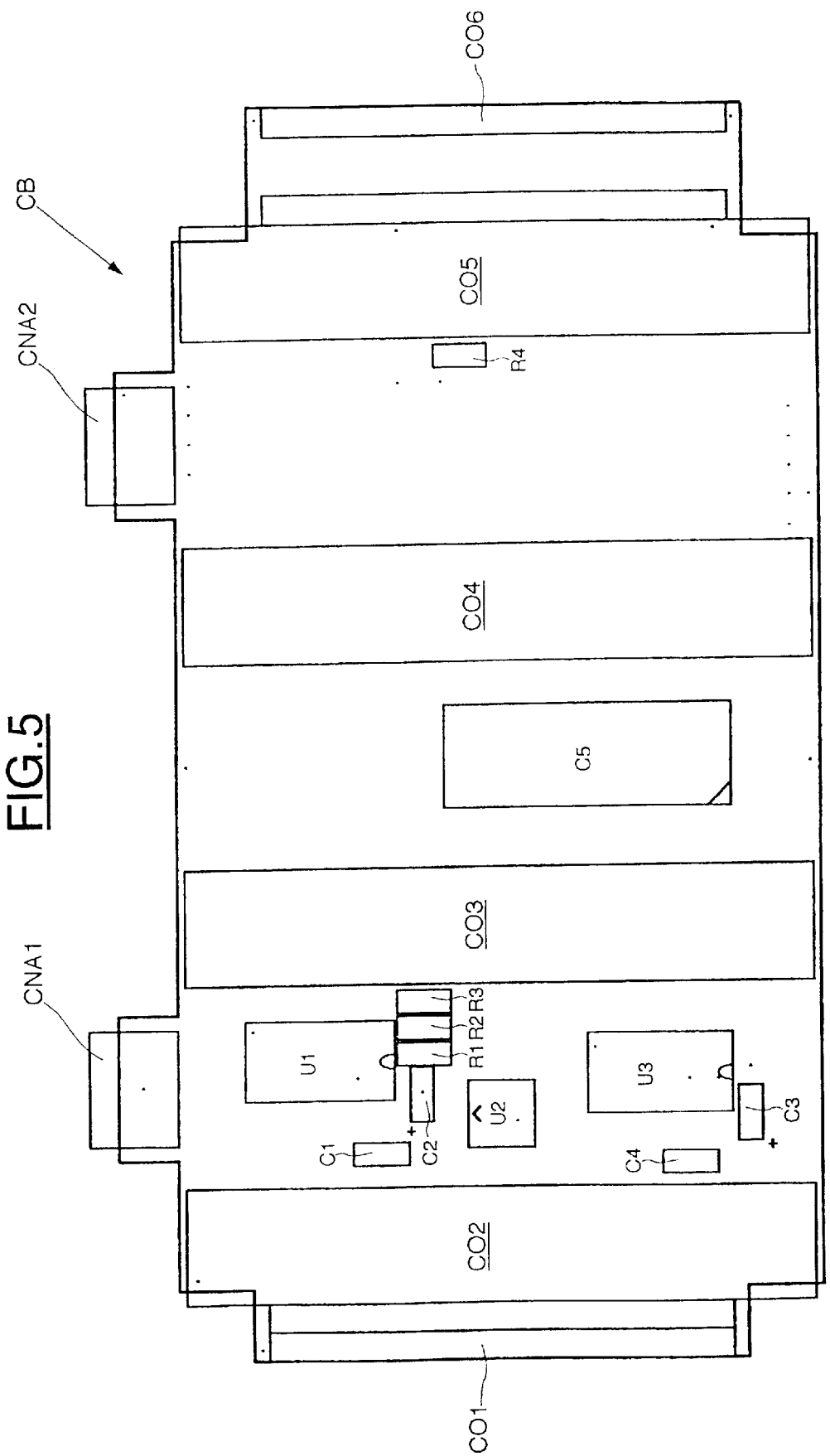
Figure 6:
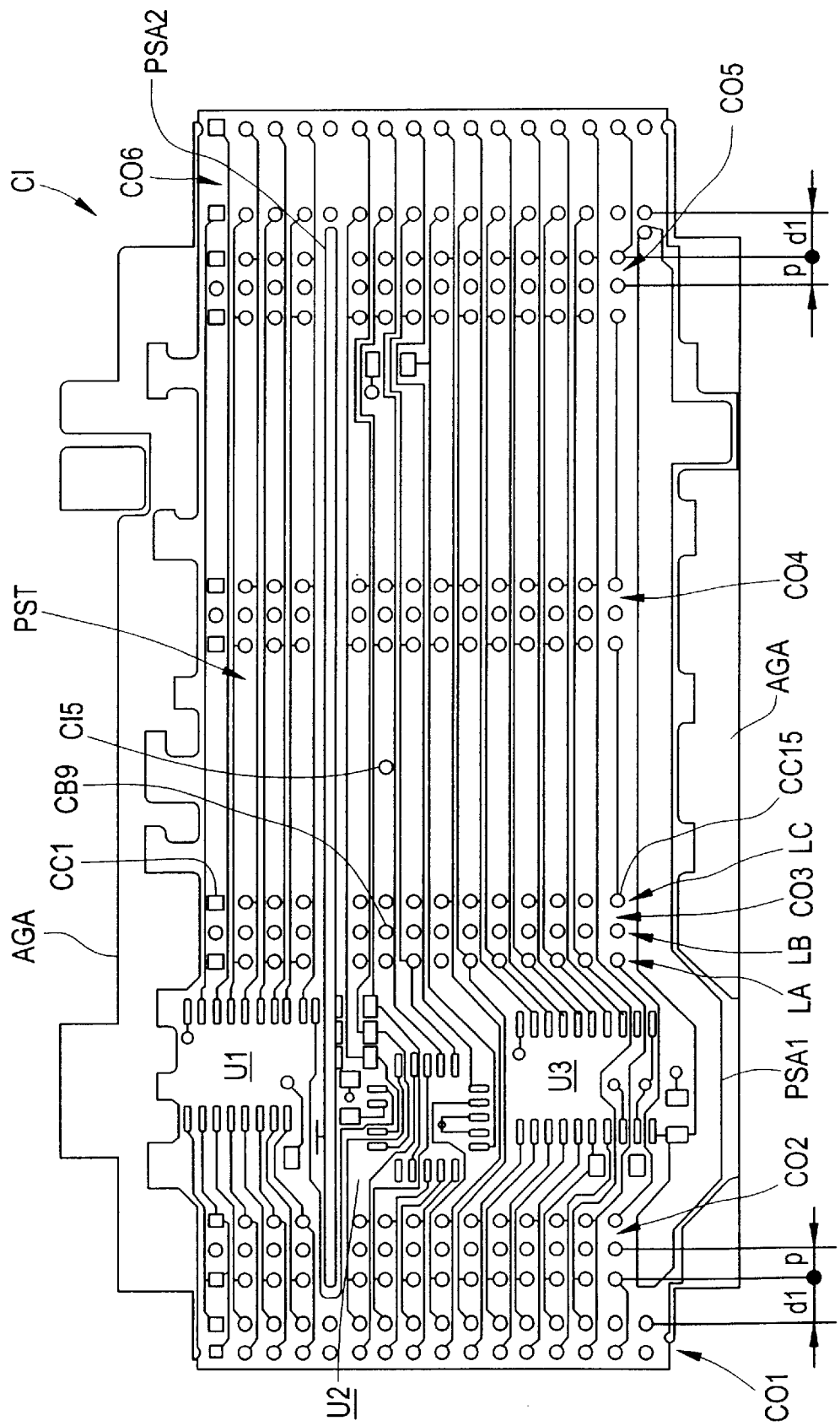
Figure 7:
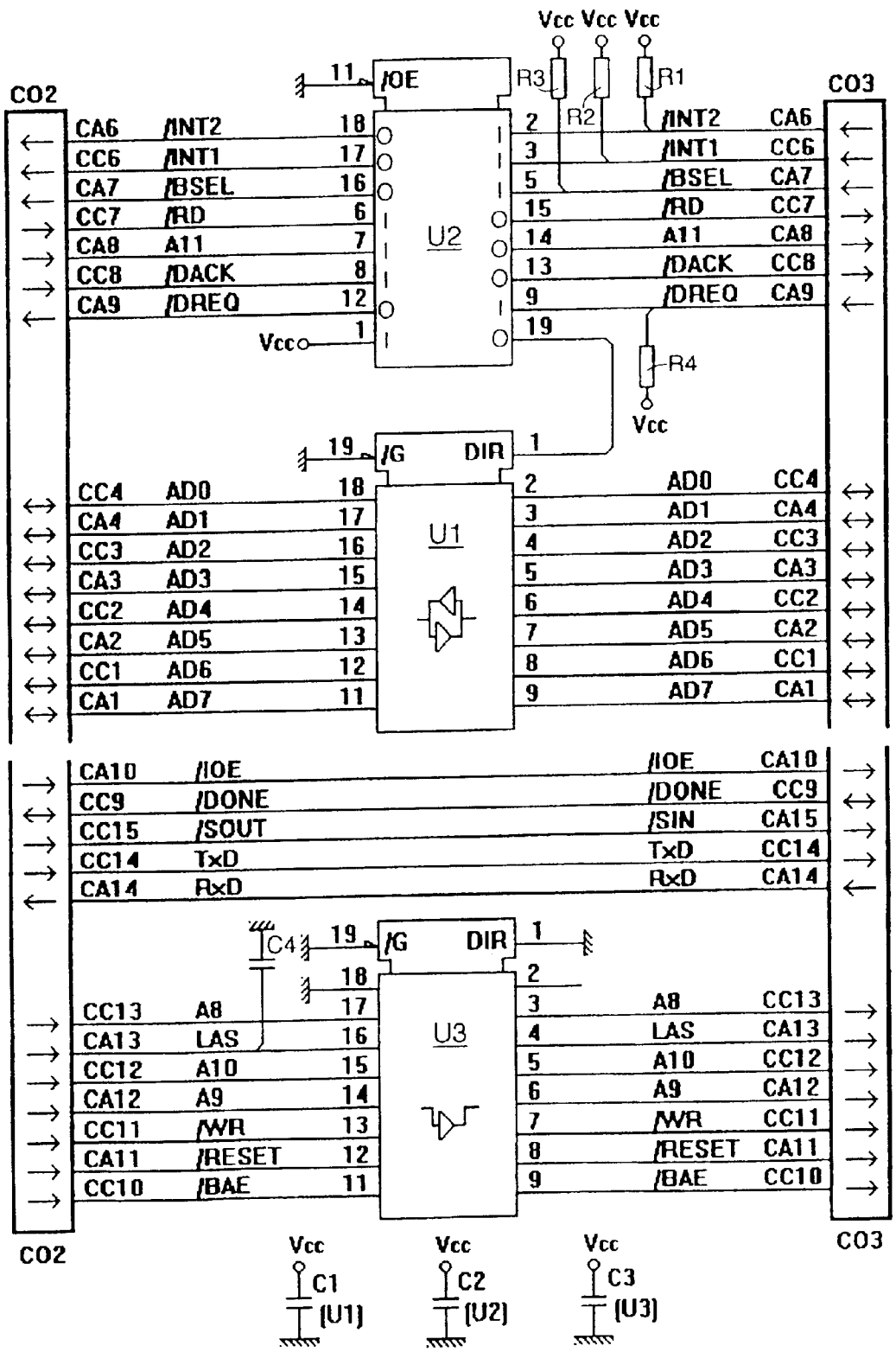
Figure 8:
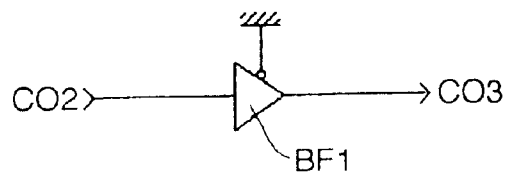
Figure 9:
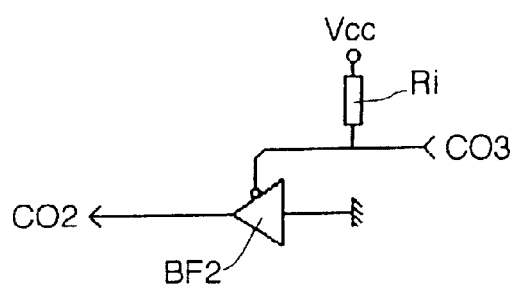
Figure 10:
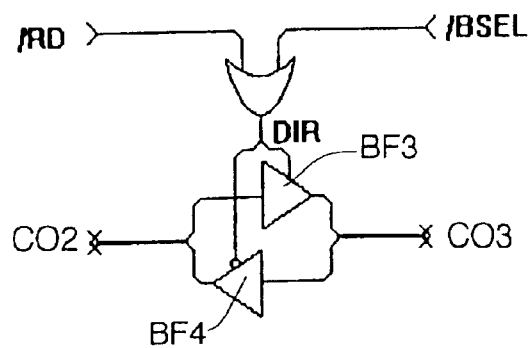
Figure 11:
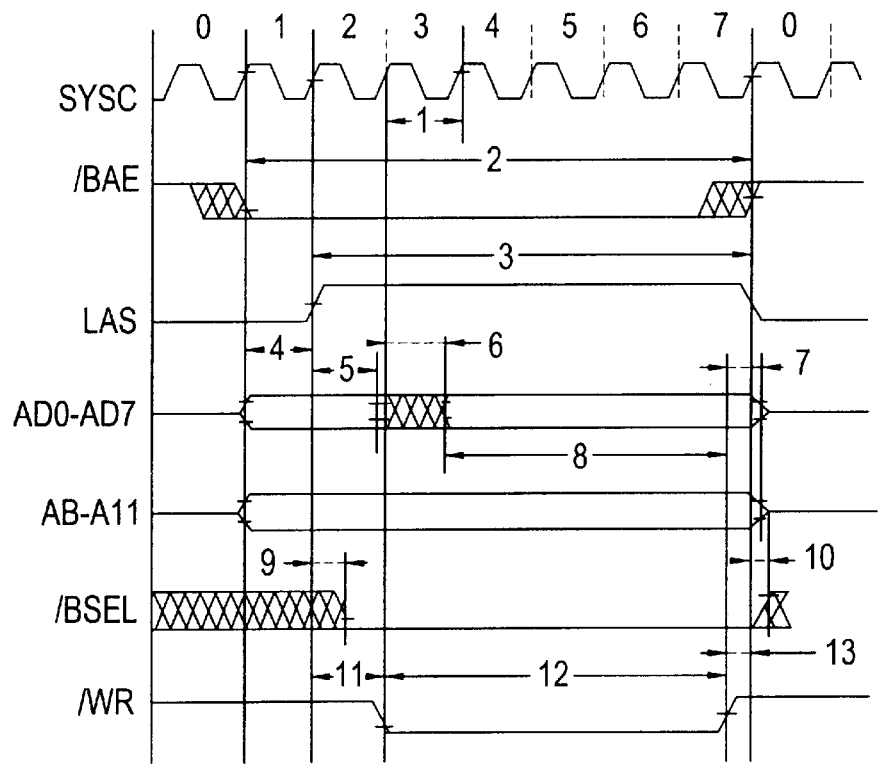
Figure 12:
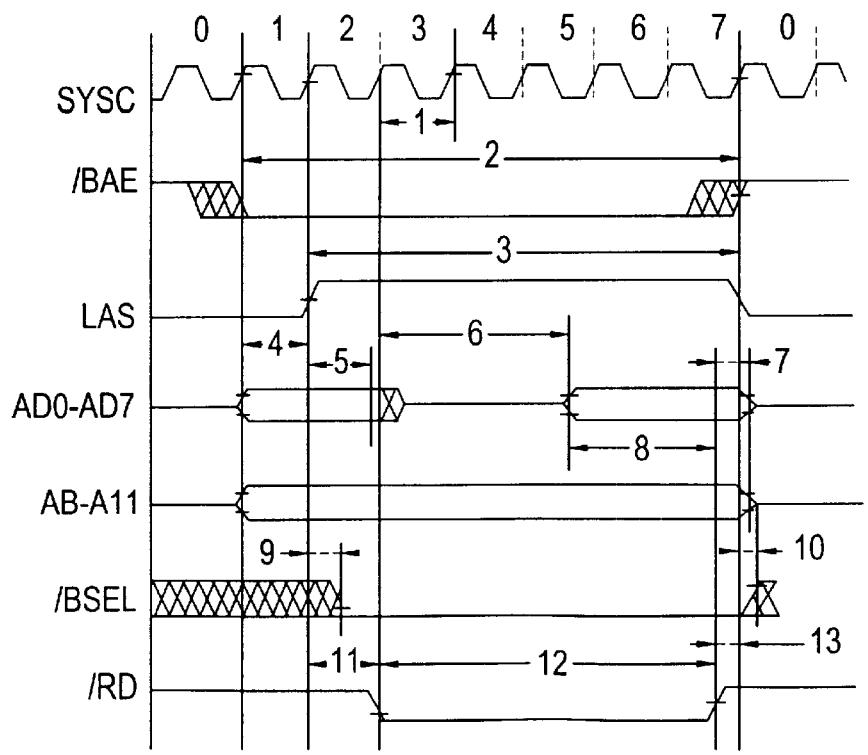
Figure 13:
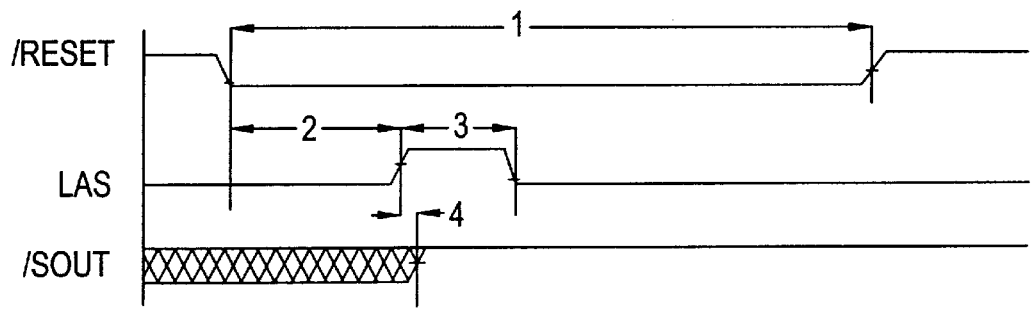
Figure 15:
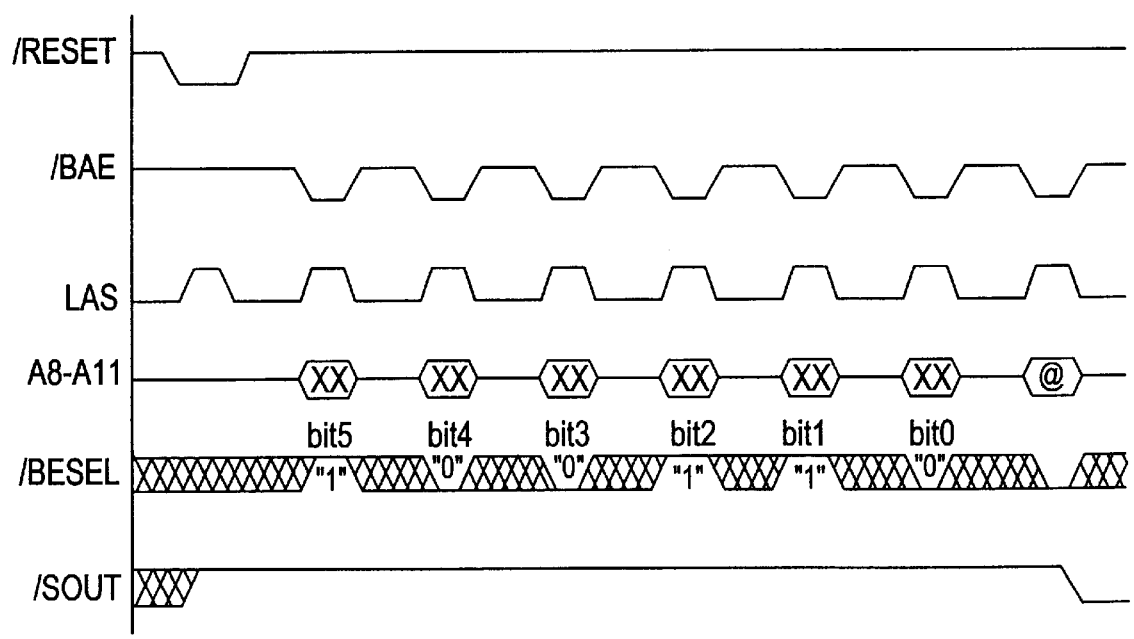
Figure 14:
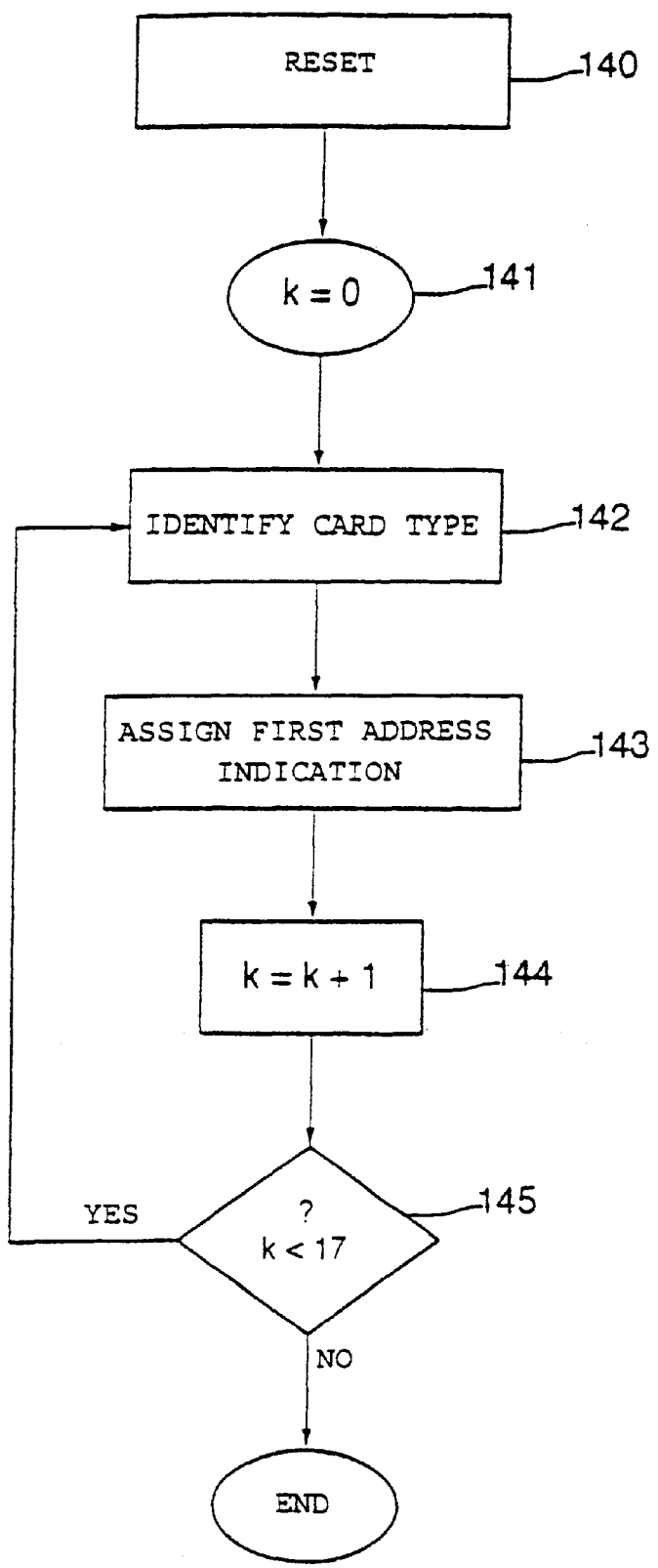
Figure 16:
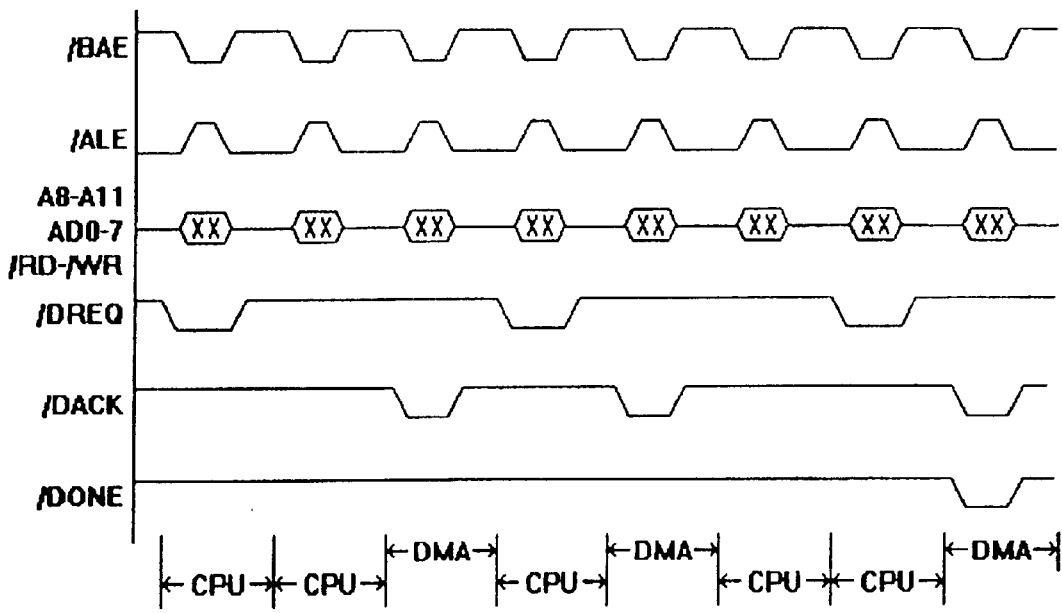
Figure 17:
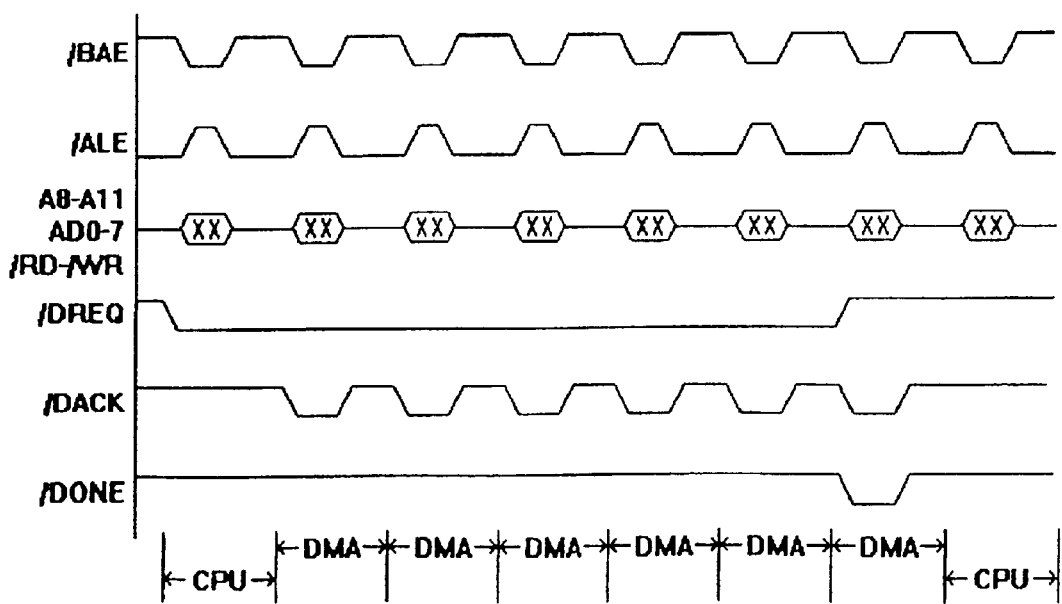
Figure 18:
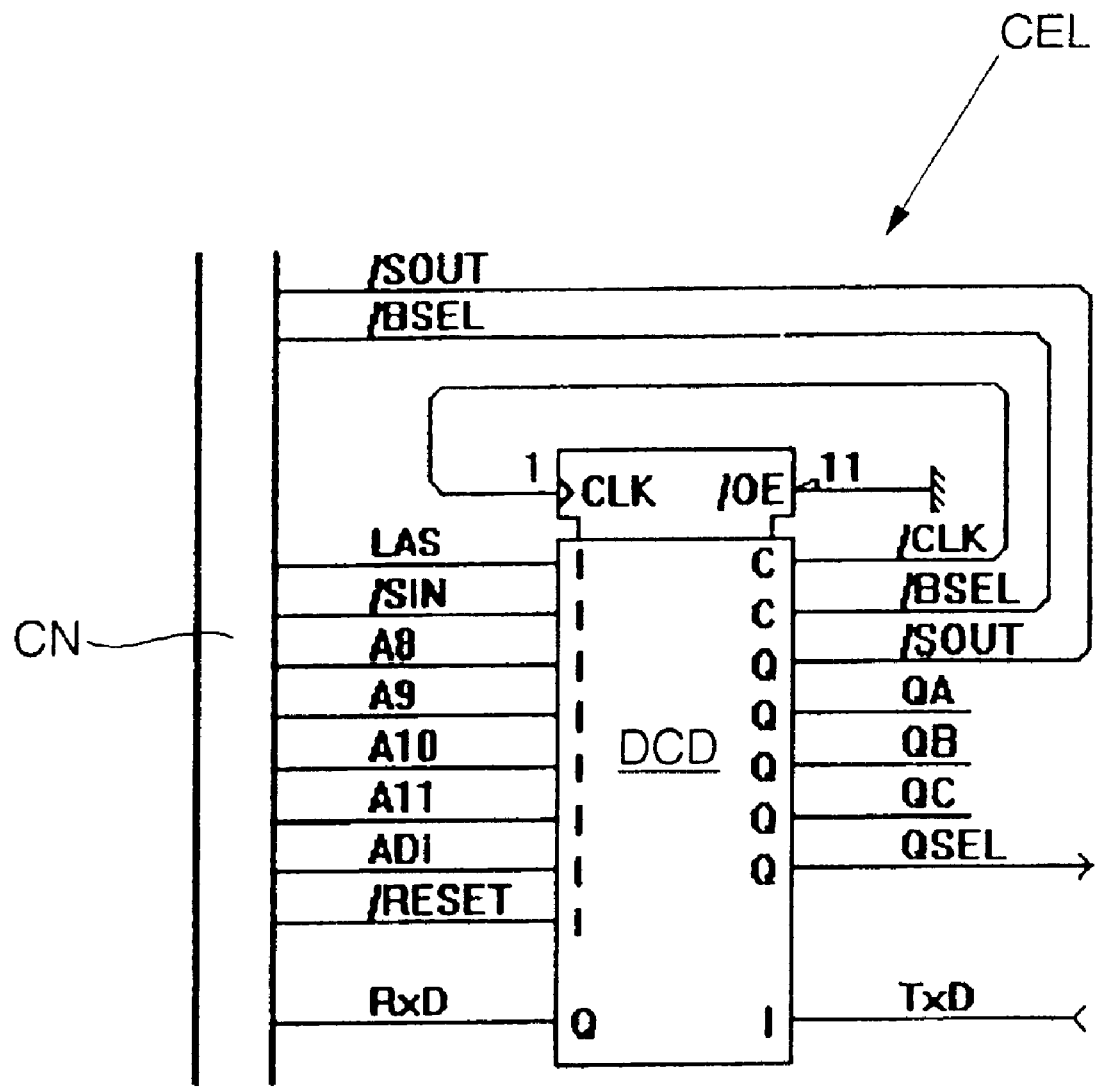

Other advantages and characteristics of the invention will become apparent on examining wholly non-limiting embodiments and modes of implementation of the invention, and the appended drawings in which:

FIG. 1 is a diagrammatic representation of a base card according to the invention, FIG. 2 is a diagrammatic cross section of the card of FIG. 1, FIG. 3 diagrammatically illustrates an electronic card intended to be connected on a base card such as that of FIG. 1, FIG. 4 illustrates the electronic card of FIG. 3 connected on a base card, FIG. 5 very diagrammatically illustrates the installation of the components and connectors on a base card, FIG. 6 is a representation of a set of tracks of a printed circuit of a base card, FIG. 7 very diagrammatically represents the logic interconnections between various components of a base card, FIG. 8 very diagrammatically illustrates the principle of amplification of a signal flowing from a master card to a slave card, while FIG. 9 very diagrammatically illustrates the principle of amplification of a signal flowing from a slave card to a master card and FIG. 10 very diagrammatically illustrates the principle of bidirectional amplification of electrical signals flowing on a base card, FIG. 11 is a timing diagram of a write access on the bus, FIG. 12 is a timing diagram of a read access on the bus, FIG. 13 is a timing diagram of a phase of resetting the electronic cards, FIG. 14 is a simplified flowchart of an automatic recognition of cards connected on the bus, FIG. 15 is a timing diagram relating to such an automatic recognition of cards, FIGS. 16 and 17 illustrate two modes of transferring data of the "direct memory access" type, and FIG. 18 very diagrammatically illustrates a programmable logic circuit arranged on a slave electronic card allowing management of the mutual exclusion of the slave cards in a master cards/slave cards dialog.

As illustrated in FIGS. 1 and 2, the reference CB denotes in general a base card, or backplane card, on which it will be possible to connect electronic cards (also dubbed "interface cards" in the subsequent text) which are able to exchange digital information.

The connection system SCX here comprises a package BT having dimensions of the order of 110 mm wide, 124 mm high and 32 mm thick and housing an electronic base card. This base card CB here comprises four base connectors CO2–CO5 which emerge on the front face of the package BT via four slots made in this front face.

The base card CB also comprises a first extension connector CO1, which here is a male connector, and at its other end, a second extension connector CO6, which here is a female connector. The two bent complementary extension connectors also emerge outside the package BT.

While the base connectors CO2–CO5 are intended to receive complementary connectors CN (FIG. 3) of an interface card CEL housed in a package BTL, the extension connectors CO1 or CO6 are intended to interconnect several base cards together so as to constitute a backplane of adjustable length.

The package BT of the connection system SCX also incorporates supply means (not represented for the sake of simplification) individual to the base card CB and intended in particular for supplying amplification means directly arranged on this base card. These supply means are moreover dimensioned in such a way as to be able to supply all the interface cards (here four) liable to be connected in parallel on the base card.

This supply can be of the chopped regulator type, delivering a regulated supply voltage of 5 volts DC from, in the example described here, an input voltage of 24 volts DC available at the pads PL4 and PL5 of the package.

In addition to a housing FS containing a fuse for this supply, the package moreover comprises ground tap pads PL3.

The package BT moreover comprises a notch FX for fixing on rails arranged in racks.

The packages BTL of the interface cards CEL intended to be connected on the base connectors of the base card, furthermore comprise pads PL1 and PL2 able to cooperate removably with slots FF1 and FF2 made on either side of a base connector in the package BT, so as to allow mechanical fixing of the package BTL on the package BT as illustrated in FIG. 4.

Finally, the package BTL comprises luminous indication means, such as light-emitting diodes, allowing monitoring of the activation of the functions of these interface cards, as well as input/output connectors (not represented in FIGS. 3 and 4 for the sake of simplification).

In FIG. 5, which represents the "components side" face of the base card CB proper, the length of which is of the order of 109 mm and the overall width of which is of the order of 61 mm, the installation of the various components and connectors of this card has been represented very diagrammatically.

Between two base connectors, namely the connector CO2 and CO3, are arranged the amplification means of the card which here are composed essentially of a first bidirectional amplification circuit U1 able to amplify, as will be seen in greater detail below, the data signals and a part of the address signals of the digital bus conveyed on the base card, of a bidirectional programmable logic circuit U2 able to amplify a part of the bus monitoring signals, and of a second amplification circuit operating in monodirectional mode U3 able to amplify in an upstream to downstream or master to slave direction another part of the address signals the the remaining signals for monitoring the bus.

With these three circuits U1–U3 are associated three decoupling capacitors C1, C2 and C3. There are moreover provided four high-impedance resistors, three of which, references R1 to R3, are arranged between the two connectors C2 [sic] and CO3, and the fourth of which, referenced R4, is arranged in the vicinity of the connector CO5.

A clipping capacitor C4, the function of which will be specified in greater detail below, and a capacitor C5 forming an energy reservoir, are also provided on this card.

Finally, the references CNA1 and CNA2 denote the connectors of the supply means.

FIG. 6 illustrates one of the faces of the double-faced printed circuit CI of a base card.

This face is the one which features the set of so-called "useful" tracks PST linking together the various components and the connectors and conveying the electrical signals of the bus. Moreover, also featured on this face are the components U1, U2, U3 which are in this instance surface-mounted components (SMC components) as well as the resistors and capacitors described above.

The printed circuit CI comprises at the level of the two longitudinal edges of the card, two wide tracks AGA commonly referred to as guard rings by the person skilled in the art, and whose role is to assist with the electromagnetic immunization of the card.

Apart from these two guard rings, two 5-volt supply tracks referenced PSA1 and PSA2 respectively, are provided.

Moreover, the base card comprises, at the level of the tracks of the printed circuit, groups of transverse rows of connection holes, each group being able to receive the pins of the extension connectors CO1 or CO6, or of the base connectors CO2–CO5, which are therefore all connected in parallel.

Each base connector is a connector with 48 pins distributed in three lines LA, LB, LC of 16 pins. In the text below, for each base connector, the reference CAi, i varying from 1 to 16, denotes the pin of a base connector situated on the line LA and having the number i, while the references CBi and CCi denote the counterpart pins situated on the lines LB and LC respectively. Furthermore, for the sake of simplification, these same references will for a given base connector denote the corresponding connection holes on the printed circuit.

As may be seen in FIG. 6, all the connection holes CBi, except the connection holes CB5 and CB16 of a base connector, are not linked to any track situated on the depicted face of the printed circuit, but are only metalized interconnection holes emerging on the other face on which they are all connected to a grounded metalized plane.

Likewise, certain connection holes, which, in FIG. 6 are not linked to any track, are also metalized interconnection holes passing through the printed circuit and linked to the ground plane situated on the other face. Such for example is the case for the hole CI5 receiving one of the pins of the capacitor C5.

At the ends of the card are provided two groups of interconnection holes for the pins of the bent extension connectors CO1 and CO6.

The transverse rows of one and the same group of interconnection holes assigned to a base connector are spaced apart by a predetermined spacing pitch p here taken equal to 2.54 mm. The same goes for the two transverse rows of the group of interconnection holes of the connector CO1.

Conversely, the two transverse rows of the group of interconnection holes assigned to the extension connector CO6 are spaced apart by a distance equal to three times this spacing pitch p.

Furthermore, while the distance separating two adjacent rows (for example the rows LC and LA) belonging respectively to two neighboring groups assigned to two base connectors (for example the connectors CO2 and CO3) are spaced apart by a distance equal to eleven times the spacing pitch, the distance d1 separating the two adjacent rows belonging to the connectors CO1 and CO2, or the two adjacent rows belonging to the connectors CO5 and CO6, is taken equal to one and a half times the spacing pitch p. Thus, by using in particular 48-pin half-format connectors known by the label 41612-C for the base connectors and HE13 connectors from the company AMP for the extension connectors, an equidistance is obtained for the interface cards CEL connected on a base card, and also an equidistance between all the interface cards connected on several interconnected base cards. By way of example, the gap between these interface cards CEL is 1.1 inches.

As may be observed, the digital bus supported in a hardware manner by this set of tracks has a very large proportion of supply and ground lines (14 grounds and 6 supplies for a total of 48 pins per base connector, this representing 42% of the pins of the connector). This, together with the fact that the set of useful tracks and the set of components (apart from the supply) is situated on a single face of the printed circuit, whereas the other face is assigned to a ground plane, assists with good electromagnetic immunization of the bus.

Moreover, the fact that the circuit U2 has been placed between the circuits U1 and U3 has made it possible to obtain this particular double-faced characteristic of the printed circuit, and also to obtain this same characteristic on the interface cards connected on the base card.

It is now assumed, while referring more particularly to FIG. 7, that two interface cards intended for exchanging digital information by way of a digital bus flowing on the set of tracks of the printed circuit, are connected respectively on the connectors CO2 and CO3 of the base card.

It will be considered below that the interface card connected on the connector CO2 is a master interface card and is linked to a processing unit such as a processor, it being possible for the latter to be installed directly on the interface card itself or else be linked by wiring thereto. Likewise, the interface card connected on the connector CO3 will be denoted by the term slave card. By analogy, in relation to the amplification means arranged between these two connectors, the upstream side will be the side corresponding to the connector CO2, whereas the downstream side will be the side corresponding to the connector CO3.

In general, the digital bus according to the invention possesses:

eight address/data multiplexed lines conveying the signals AD0–AD7, four address lines conveying the high-order bits represented by the signals A8–A11, nine bus monitoring lines, conveying the monitoring signals LAS, /BAE, /BSEL, /RD, /WR, /RESET, /IOE, /SIN, /SOUT.

three lines for monitoring transfer according to the direct memory access mode (DMA mode), conveying the monitoring signals /DACK, /DONE, /DREQ, two serial bus lines conveying the signals RxD, TxD, two interrupt lines conveying the interrupt signals /INT1, /INT2, twenty general ground and supply lines.

A brief definition of the these various signals conveyed on the bus will now be given, at least some of them being explained in greater detail below.

The signal /SIN is an initialization input logic signal which is enabled at the low logic level and which indicates that a current interface card upstream on the digital bus has been recognized in the automatic card recognition phase. It is assigned to the pin CA15 of a connector.

The signal /SOUT is an initialization output logic signal, enabled at the low level, assigned to the pin CC15 of the connector and which indicates to an interface card connected downstream on the digital bus that the interface card which issues this signal /SOUT has been recognized.

The signal RxD is a signal serving for the serial exchanges between master cards and slave cards all linked to processors. This signal is sent to the master processor card by the selected slave processor card. This signal is unidirectional from downstream to upstream and is assigned to the pin CA14 of the connector.

The signal TxD serves also in the serial exchanges between such cards. This signal is sent by the master processor card, it is unidirectional from downstream to upstream, and assigned to the pin CC14 of the connector.

The logic signal LAS is an enabling logic signal which serves in particular to control, at the start of the bus cycle, the register for storing the addresses A0–A7, a register situated on the interface cards CEL. This logic signal is active at the high level and the rising edge of this signal manifests the sampling of the low-order addresses A0–A7. It is assigned to the pin CA13 of the connector.

The signals A8, A9 and A10 are address signals conveying respectively the high-order address bits No. 8, 9 and 10 during access on the bus. These signals are positioned by the master card, and are assigned to the pins CC13, CA12 and CC12 respectively of the connector.

The signal /RESET is a so-called reset monitoring signal which is set by the master card. It is enabled at the low level and indicates in particular that an automatic card recognition step will take place after the reset step. It is assigned to the pin CA11.

The signal /WR is a monitoring signal set by the master card. It specifies the write mode during write access on the bus and is enabled at the low level. It is assigned to the pin CC11 of the connector.

The signal /IOE is a monitoring signal set by the master card during an access within the input/output space of the processor. It is active at the low level and signals that the access in progress on the digital bus complies with PC (Personal Computer) compatible peripheral accesses. It is assigned to the pin CA10 of the connector.

The signal /BAE is an access control logic signal set by the master card. It indicates that a bus access is in progress and is enabled at the low level. It is assigned to the pin CC10 of the connector.

The signal /DREQ is a signal set by an interface card connected on a base card and operating in DMA mode. It is active at the low level and conveys a DMA request for transfer to the master card. It is assigned to the pin CA9 of the connector.

The signal /DONE is a bidirectional signal set by the master card or by the slave card having made the DMA requests for transfer so as to notify the termination of the transfer. This signal is enabled at the low level and is assigned to the pin CC9 of the connector.

The signal A11 conveys the high-order bit No. 11 of an address cue during access on the digital bus. This signal is set by the master card and is assigned to the pin CA8 of the connector.

The signal /DACK is set by the master card and is active at the low level. It specifies that the access in progress on the digital bus is a DMA type access. It is assigned to the pin CC8 of the connector.

The signal /BSEL is a selection logic signal set by the interface card CEL having recognized its address cue. Moreover, this signal is enabled at the low level when the selected card has been automatically recognized by the master card. Furthermore, in this automatic recognition phase, this signal conveys the type of the card. This signal is assigned to the pin CA7 of the connector.

The signal /RD is a monitoring signal set by the master card which specifies the read mode during an access on the digital bus. This signal is enabled at the low level and is assigned to the pin CC7 of the connector.

Signals /INT2 and /INT1 are two signals respectively conveying interrupt requests to the master card. They are enabled at the low level and assigned respectively to the pins CA6 and CC6 of the connector.

The signals AD1, AD0, AD3, AD2, AD5, AD4, AD7 and AD6 are bidirectional signals conveying in multiplexed mode the corresponding low-order address bits Ai and the data bits Di. They are respectively assigned to the pins CA4, CC4, CA3, CC3, CA2, CC2, CA1 and CC1 of the connector.

The pins CA5, CB5, CC5, CA16, CB16 and CC16 of the connector are all linked to the 5-volt supply which provides a regulated voltage of between 4.8 and 5 volts DC.

Finally, the pins CB1–CB4 and CB6–CB15. of the connector are linked to the ground plane.

In the example illustrated in FIG. 7, the components U1 and U3 incorporate bidirectional amplification barriers. It is for example possible to use the components marketed by the company SGS-THOMSON under the reference M 74 HCT 245.

As regards the component U3, the control input DIR of this component is linked to ground, thus setting the amplification barrier in the upstream to downstream direction.

By contrast, the component U1 has its control input DIR linked to an output of the component U2. It is therefore bidirectional as a function of the value of the signal received on its direction control input DIR.

The person skilled in the art will be able to refer to FIG. 7 to ascertain the particular pinout of these components U1 and U3.

As regards the logic signal LAS, the track conveying it is linked to ground by way of the clipping capacitor C4, of for example 100 pF, making it possible to clip this signal LAS.

The component U2 is a programmable logic circuit, for example the one marketed by the company AMD under the reference PALCE 16V8.

The person skilled in the art may also refer to FIG. 7 to ascertain in greater detail the pinout of this component. The high-impedance resistors R1, R2, R3 and R4 are respectively associated with the logic signals /INT2, /INT1, /BSEL and /DREQ. For this circuit, the logic equations between the input and output signals are equalities with the exception of the one relating to the output signal from pin 19 which is the product /BSELx/RD and from pin 14 which is the complement of the signal A11.

Only four signals of the bus are not amplified, namely the signals /IOE, /DONE, TxD and RxD. This is because these signals are in general reserved for cards equipped with a processor which are rarely very numerous within the same configuration. Furthermore, the signals /SOUT and /SIN need not be amplified since they pass only from an interface card CEL to the immediately neighboring interface card CEL.

Furthermore, the fact that these signals are not amplified makes it possible to install the useful tracks PST on a single face of the printed circuit.

Represented in FIGS. 8 to 10 are the principles of monodirectional and bidirectional amplification corresponding to their hardware embodiment within amplification means of the base card.

Thus, the amplifiers BF1 for the monodirectional signals going from upstream (connector CO2) to downstream (connector CO3) are always active (FIG. 8). The amplifiers BF2 for the monodirectional signals going from downstream (connector CO3) to upstream (connector CO2) are conditioned by the state of these downstream signals (FIG. 9). When the downstream signal is inactive, the upstream output remains in three states.

Among the amplified bidirectional signals may be found the signals AD0–AD7. The information is conveyed upstream exclusively during a read cycle on condition that the data are sent by an interface card placed downstream (selection logic signal /BSEL of the interface card in the low state). Otherwise, the amplification barrier is automatically activated downstream (FIG. 10). Specifically, an OR logic gate is provided, the two inputs of which respectively receive the signals /RD and /BSEL and the output of which is linked to the control input DIR of the circuit U1.

The various types of access on the digital bus according to the invention will now be described in greater detail while referring more particularly to FIGS. 11 et seq.

Every exchange of digital information on the bus according to the invention is synchronous. Therefore, every exchange is clocked with the aid of a virtual clock signal SYSC, which is however not present on the digital bus since the latter is devoid of any clock signal. Nevertheless, this virtual signal serves as system clock to ensure the time sequencing of the signals generated by the master cards and the slave cards. This is why this signal SYSC, which is not dispatched over the digital bus, is nevertheless presented in the timing diagrams illustrated in FIGS. 11, 12 and 13, and which are respectively representative of the write read and reset cycles.

The maximum frequency of this virtual clock is 25 MHz and, in a general manner, any access of write or read type on the digital bus lasts seven clock periods.

In conjunction with FIG. 11 which illustrates the timing diagram for a write access on the digital bus, Table 1 below mentions numerical values for the various time intervals of this access which are tagged in FIG. 11 by numerals surrounded by a circle.

TABLE 1

| Num. | Characteristics | Min. | Max. | Unit |
|---|---|---|---|---|
| 1 | tcyc: period of SYSC (1 Hz to 25 MHz) | 40 | — | ns |
| 2 | Global duration of a cycle = 7 × tcyc | 280 | — | ns |
| 3 | LAS enabled = 6 × tcyc | 240 | — | ns |
| 4 | Addresses enabled before edge on LAS | tcyc − 20 | — | ns |
| 5 | Addresses held after edge on LAS | tcyc − 15 | — | ns |
| 6 | Data enabled after /WR active | 0 | 2 × tcyc + 30 | ns |
| 7 | Data held after /WR inactive | 10 | — | ns |
| 8 | Data enabled before /Wr inactive | 2 × tcyc | 5 × tcyc − 25 | ns |
| 9 | /BSEL active after edge on LAS | 15 | 55 | ns |
| 10 | /BSEL held after LAS inactive | 0 | — | ns |
| 11 | /WR active after edge on LAS | tcyc − 30 | tcyc + 30 | ns |
| 12 | /WR held active | 4.5 × tcyc | 5.5 × tcyc | ns |
| 13 | /WR inactive before LAS inactive | — | 0.5 × tcyc | ns |

Likewise, in conjunction with FIG. 12 which illustrates the timing diagram for a read access on the digital bus, Table 2 below mentions numerical values for the time intervals tagged by a numeral surrounded by a circle in FIG. 12.

TABLE 2

| Num. | Characteristics | Min. | Max. | Unit |
|---|---|---|---|---|
| 1 | tcyc: Period of SYSC (1 Hz to 25 MHz) | 40 | — | ns |
| 2 | Global duration of a cycle = 7 × tcyc | 280 | — | ns |
| 3 | LAS enabled = 6 × tcyc | 240 | — | ns |
| 4 | Addresses enabled before edge on LAS | tcyc − 20 | — | ns |

TABLE 2-continued

| Num. | Characteristics | Min. | Max. | Unit |
|---|---|---|---|---|
| 5 | Addresses held after edge on LAS | tcyc − 15 | — | ns |
| 6 | Data enabled after /RD active | 0 | 3 × tcyc + 30 | ns |
| 7 | Data held after /RD inactive | 30 | — | ns |
| 8 | Data enabled before /RD inactive | 2 × tcyc | 5 × tcyc − 25 | ns |
| 9 | /BSEL active after edge on LAS | 15 | 55 | ns |
| 10 | /BSEL held after LAS inactive | 0 | — | ns |
| 11 | /RD active after edge on LAS | tcyc − 30 | tcyc + 30 | ns |
| 12 | /RD held active | 4.5 × tcyc | 5.5 × tcyc | ns |
| 13 | /RD inactive before LAS inactive | — | 0.5 × tcyc | ns |

As regards write and read accesses, the enabling logic signal LAS makes it possible in particular to optimize the address decoding circuits arranged on the interface cards. Furthermore, it has two complementary functions. On the one hand, it enables the low-order addresses A0–A7, and on the other hand, it serves as general enable for write or read access, since it remains enabled up to the end of the access.

The rising edge of the signal LAS indicates the stability of the addresses A0–A7. This edge serves equally well as clock with D-type flip-flops as for programmable logic circuits with registers for implementing address decoding circuits. As compared with a signal ALE of the prior art and defined in the bus 8051 of the company INTEL, where the demultiplexing of the low-order addresses is carried out on the falling edge of the signal ALE with the aid of a latching function, the signal LAS of the bus according to the invention offers the same functionality, but, since the clock inputs of the address decoding logic circuits installed on the slave interface cards are controlled directly on the rising edges of this enabling logic signal, it allows the direct use of programmable logic circuits with registers and makes it possible to minimize the number of components required on the interface cards.

Furthermore, the second characteristic of this enabling logic signal LAS is to serve as general reference for the access cycles on the bus. This is because it remains at the high level during the exchange of data and may thus be employed as clock for conventional components installed on the interface cards, for example conventional components marketed by the company MOTOROLA.

The access logic signal /BAE which indicates, when it is at the low level, that a read or write bus access is in progress, is enabled throughout the access cycle. Any interface card placed on the bus can therefore ascertain whether an access is taking place thereon. Moreover, all the other access monitoring signals, namely the signals /RD, /WR and LAS generated by the master card, are enabled only when the signal /BAE is at the low level.

FIG. 13, in conjunction with Table 3 below, illustrates the step for resetting the slave interface cards connected on the bus.

TABLE 3

| Num. | Characteristics | Min. | Max. | Unit |
|---|---|---|---|---|
|  | tcyc: period of SYSC (1 Hz to 25 MHz) | 40 | — | ns |
| 1 | /RESET enabled | 10 × tcyc | — | ns |
| 2 | Edge on LAS after /RESET enabled | 6 × tcyc | — | ns |
| 3 | /LAS enabled | 6 × tcyc | — | ns |
| 4 | /SOUT inactive after the edge on LAS | — | 25 | ns |

The signal LAS prompts a reset of the interface cards whenever the signal /RESET is at the low level at the time of the rising edge of the signal LAS. In particular, this reset step has the effect of causing the signals /SOUT of each interface card connected on the digital bus to go to the high level.

Such a card reset step will be used for the dynamic interface card recognition stage which will now be described, more especially in conjunction with FIGS. 14 and 15.

Such a dynamic recognition phase offers two main advantages. On the one hand, it simplifies the task of the users, and on the other hand, it increases the security of industrial applications.

This is because such an automatic card recognition phase increases the reliability of the systems insofar as any software can verify the presence of the cards which it needs and act knowledgeably. The users are no longer constrained to use mechanical jumpers for mechanically assigning their first address indications to the cards. As far as designers are concerned, with this dynamic recognition phase they have available a powerful tool which is simple to implement and adaptable to any type of processor and which considerably reduces the necessary indications contained in the user manuals.

To allow this automatic recognition phase, an identifier representative of a card type chosen from among the predefined types is stored in the slave interface cards. Among the possible types mention may be made of four-relay logic cards, logic cards with eight all-or-nothing outputs, logic cards with eight all-or-nothing inputs, analog cards with two outputs, 12 bits or more, analog cards with eight inputs, 12 bits or more, etc.

This automatic recognition phase comprises a step of automatic identification by the master card, of the type of each slave card connected on a base card (step 142, FIG. 14), then a step of automatic assignment by the master card, to each identified slave card, of its first address indication, making it possible to locate it on the bus (step 143).

These two steps start after a reset step 140, as described hereinabove.

When the invention provides for such an automatic recognition stage for interface cards, the latter are entirely standard, that is to say on powering-up, all the cards present on the bus are not yet itemized as regards their installation address. They are therefore potentially all accessible at the same time.

Discrimination of these not yet recognized cards is effected with the aid of the two logic signals /SIN and /SOUT. The role of these signals is to guarantee access to a single interface card at a time and thus to resolve the mutual exclusion of the cards present on the bus during the phases of identification and assignment of addresses.

Thus, each interface card intended to be identified automatically possesses an initialization input able to receive the initialization input logic signal /SIN and an initialization output able to deliver the initialization output logic signal /SOUT. In principle, any interface card not yet identified places its initialization output at the high level. When it has been identified and when it has received a first address indication (high-order bits), every interface card places its initialization output at the low level.

Additionally, any interface card which receives a signal at the high level on its initialization input does not react to the bus accesses performed by the master card. When its initialization input is at the low level, the interface card then takes into account the state of the signals present on the bus and reacts to the access requests of the master card.

On the bus, the signals /SIN and /SOUT are chained together. Thus, stated otherwise, the initialization output of an interface card is linked to the initialization input of the interface card placed to its right on the bus.

After the reset step 140, all the outputs /SOUT of the interface cards are at the high level. Only the interface card placed beside the master card has its input /SIN at the low level. It is therefore the only one capable of reacting to a bus access. It will therefore be possible for it to be accessed by the master card. When the latter has acquired this interface card's type, it assigns it a first address indication, which will have the effect of causing its output /SOUT to go to the low level so as to access the next interface card.

This succession of steps is illustrated in the flowchart of FIG. 14, in which the succession of automatic recognitions of cards is represented by the integer K varying in the example described from 0 to 16 since the first address indication of a card is represented by the four high-order bits A8–A11.

Any interface card capable of being identified automatically possesses an internal logic circuit capable of providing, in series, a number of bits (here 6) constituting the identifier of the type of card.

Thus, as illustrated more particularly in the timing diagram of FIG. 15, the type of card is identified by the master card by means of a series of six bus accesses in the course of which bits No. 5, 4, 3, 2, 1 and 0 forming the identifier are respectively transmitted using the track assigned to the selection logic signal /BSEL.

In the example illustrated in FIG. 15, the card type has as hexadecimal value 26.

In the course of the seventh access, the master card transmits the three high-order bits A8, A9 and A10 to the interface card. Bit A11 is not transmitted by the processor, since it results here directly from the hardware architecture of the card, and especially from the location of the programmable logic circuit U2 with respect to the base connectors. This is because, since bit A11 is inverted by the logic circuit U2, all the cards situated between two logic circuits U2 of two interconnected base cards have the same value for the bit A11. Conversely, the four previous cards or the four following cards have their bit A11 inverted.

When the interface card has received its first address indication @, its output /SOUT goes to the low level in the course of the seventh access, allowing automatic recognition of the next card.

Modes of transfer between master cards and slave interface cards of the direct memory access type (DMA) will now be described in greater detail while referring more particularly to FIGS. 16 and 17. Such a transfer is for example used in the field of communications but also in that of the processing of digitized data.

Such a transfer of the direct memory access type is entirely known to the person skilled in the art and amounts to transfers of packets of bits, for example bytes, between the slave interface cards and the master interface card. Having regard to the access times on the digital bus according to the invention, the frequency of the DMA transfers on this bus makes it possible to guarantee a transfer rate of 3.5 Mbytes/second. Thus, the digital bus according to the invention is a high-performance solution which allows large transfers for very low costs.

The solution adopted is based on the three signals /DREQ, /DACK and /DONE which are managed directly by the master interface card. These signals are very conventional signals, well known to the person skilled in the art, and numerous 8, 16 or 32-bit processors equipped with DMA channels manage them directly.

Any DMA exchange on the digital bus according to the invention allows transfer by bytes between the interface cards. This exchange is synchronized by the interface card.

Two modes are possible, mainly the interlaced mode (or steal mode) and the blocked mode (or burst mode), and are illustrated respectively in FIGS. 16 and 17, in which the reference CPU designates the processor of the master card. It should be noted that the best transfer rate will be obtained in blocked mode.

The logic signal /DREQ is set to the low level by the slave interface card so as to make a request for DMA transfer to the master interface card. This signal may have two different profiles depending on the mode of transfer used. In interlaced mode, the signal /DREQ goes back to the low level for each byte to be transferred. In blocked mode, the signal /DREQ is held at the low level during the transfer of all the bytes.

The signal /DACK is set to the low level by the master interface card in the course of a DMA transfer. It indicates that the exchange in progress is monitored directly by the DMA channel and that it corresponds to a request made on the line conveying the signal /DREQ. As may be seen in FIGS. 16 and 17, the signal /DACK goes back to the low level with each change of bytes in the interlaced mode as in the blocked mode.

Finally, the signal /DONE is a bidirectional signal which marks the end of a DMA exchange. It is set equally well by the master card as by the slave card. The first partner in the transfer which considers that the exchange has terminated, warns his opposite party by causing this signal to go to the low level.

A mode of implementation of the process according to the invention, allowing exchanges of information between interface cards which are all linked to processors, or comprising such processors, will now be described in greater detail while referring more particularly to FIG. 18.

From a general point of view, the master interface card is permitted to send simultaneous requests to several slave interface cards but to receive information originating from only a single slave card at a time. Stated otherwise, all the slaves can listen to the master, but a single slave can dispatch a master cue.

The invention makes provision to manage the mutual exclusion of the slave cards directly at the level of management logic means DCD installed on the slave cards.

For this purpose, use will for example be made of a programmable logic circuit such as the one marketed by the company AMD under the reference PALCE 20V8;

This programmable logic circuit is programmed in accordance with the equations below, in which a signal not preceded by a / is inverted with respect to the same signal preceded by the /, and vice versa:

```
QA : = /RESET * SIN * ((/A11 * /SOUT * /QA * (/(QB*QC)
      + QB*QC*A8)) + (SOUT * QA))
QB : = /RESET * SIN * ((/A11 */SOUT *
      (QA*/QB+/QA*QB*/QC+/QA*QB*QC*A9))
      + (SOUT * QB))
QC : = /RESET * SIN * ((/A11 * /SOUT *
      (QA*QB*/QC+/QB*QC+/QA*QB*QC*A10))
      + (SOUT * QC))
SOUT : = /RESET * (/QA*QB*QC + SOUT)
CLCK = SOUT * LAS * /A11 *
      (QA*A8 + /QA*/A8) * (QB*A9 + /QB*/A9)*(QC*A10
      + /QC*/A10) + /SOUT * SIN * LAS + RESET * LAS
```

-continued

```
QSEL : = /ADi
BSEL = /SOUT *
      (
      /QA*/QB*/QC     ; bit 5 = 0
      + /QA*QB*/QC    ; bit 4 = 0
      + QA*/QB*QC     ; bit 0 = 0
      )
      + SOUT * LAS * /A11 *
      (QA*A8 + /QA*/AB) * (QB*A9 + /QB*/A9)*(QC*A10
      + /QC*/A10)
BSEL. TRST = CLCK
RxD = TxD
RxD. TRST = /QSEL
```

In these equations, the signal TRST is a conventional internal signal for programmable logic circuits, which is well known to the person skilled in the art, and is used for controlling three states of an output.

The clock of the circuit DCD is controlled directly by one output of this circuit carrying out a combinatory function of the inputs. The logic flip-flops of this logic circuit are therefore updated only if certain conditions are fulfilled.

This mode of operation is imposed by the necessity for the mutual exclusion of the slave processors. This is because if the identification of the slave cards repeats the principles described hereinabove for the other interface cards, it is necessary to be able to store, in a flip-flop of the logic circuit DCD, the fact that the slave processor of the card is permitted to send the information to the master processor. This storage must be held in the logic circuit DCD as long as the slave interface card remains permitted to send. It is not therefore possible to control the clock CLCK of the circuit with the aid of the signal LAS since, otherwise, with each access on the bus by the master, the state of this flip-flop will be recalculated and therefore modified.

Accordingly, according to the invention, the clock of the logic circuit DCD is controlled on the falling edge of the signal LAS under certain conditions. Therefore, it is at the end of a bus cycle that the flip-flops of the circuit DCD are updated. The clock is controlled at the end of each access during the automatic recognition phase, then only when the card recognizes its address. The flip-flop of the logic circuit, which flip-flop is dedicated to the authorization of sending, then stores the state of the signal ADi at the end of the cycle which must be a write cycle.

The output logic signals from the circuit DCD, which are referenced QA, QB, QC, may serve as serial addresses for the slave processor. They may also be used to confirm that a card has not been recognized automatically, in particular by using the configuration 111 for these three logic signals.

The logic signal /SOUT confirms, when its output is at 1, that the card has not been recognized automatically.

The logic circuit QSEL stores the state of the signal ADi upon a write access on the card. This signal is active at the low level and then indicates that the slave processor can send a message to the master. It also confirms that the output RxD to the base card is no longer in three states.

The slave processor must therefore carry out acquisition of the signal QSEL in order to ascertain whether it is possible for it to dispatch a message to the master.

Several solutions can be envisaged in this regard.

Either the slave listens to all the messages, even those which are not intended for it. It must then carry out a sorting operation and scan the line QSEL to communicate with the master.

Or the slave disables reception so long as the signal QSEL is not at the low level. It is therefore not disturbed by the messages which are not intended for it. The passing of the signal QSEL to the low state may serve as interrupt for the slave processor.

In all cases, the master retains the possibility of dispatching a message in parallel to all the slave processors by causing all the outputs QSEL to go to the low state.

In the form in which it has just been described, the connection system according to the invention therefore has an extendible modular backplane with a single supply voltage (+5 volts). It serves as hardware support for a digital bus compatible with the majority of 8, 16 and 32-bit microprocessors, and offers a wide place [sic] of operating frequencies of up to 25 MHz. The connection system according to the invention furthermore makes it possible to construct double-faced interface cards, it being possible for the soldering face of these cards to be assigned exclusively to a ground plane, this being especially useful in order to comply with the electromagnetic immunity standards while obtaining a very low card cost.

In the embodiment just described, various modes of implementation of the process were alluded to which provided for read/write accesses, phases of reset, automatic recognition of cards and exchange between master and slave processors. Of course, all these modes of implementation are mutually independent. Stated otherwise, it is possible to provide solely read/write access cycles, possibly accompanied by reset phases. It is also possible to provide for automatic card recognition phases without necessarily using or providing for DMA exchanges and/or exchanges between master and slave processors. Likewise, it is possible to provide for the possibility of performing DMA exchanges and/or exchanges between master and slave processors without necessarily using automatic recognition of card types. In this case, the addresses will have to be contrived on the interface cards according to the conventional prior art providing for mechanical jumpers.

We claim:

1. Process for exchanging digital information between electronic cards, characterized in that the electronic cards (CEL) are removably connected on at least one base card (CB) comprising its own individual supply means connected on a printed circuit (CI) possessing a set of tracks (PST) for the flow of electrical signals able to convey the said information, and certain at least of the electrical signals flowing, on this base card, between the connection areas of the electronic cards are amplified (U1–U3) directly on the base card;

wherein said set of tracks (PST) forms a hardware support for a digital bus on which are conveyed, synchronously, data logic signals (ADi), address logic signals (ADi), as well as monitoring logic signals, with the exclusion of any clock logic signal; and on the digital bus, all logic signals are conveyed synchronously for using predetermined cycles times for determining the duration of the various processing operations in advance.

2. Process according to claim 1, characterized in that more than two electronic cards are connected on the base card (CB) on equidistant connection areas (CO2–CO5).

3. Process according to claim 1, characterized in that at least one other base card (CB) of similar structure is connected on the base card (CB) so that, preferably all the connection areas of the electronic cards, situated on the set of base cards, are equidistant.

4. Process for exchanging digital information between electronic cards, characterized in that the electronic cards (CEL) are removably connected on at least one base card (CB) comprising a printed circuit (CI) possessing a set of tracks (PST) forming a hardware support for a digital bus on which are conveyed, synchronously, data logic signals (ADi), address logic signals (ADi), as well as monitoring logic signals, with the exclusion of any clock logic signal; and on the digital bus, all logic signals are conveyed synchronously for using predetermined cycles times for determining the duration of the various processing operations in advance.

5. Process according to claim 4, for exchanging information between a master electronic card comprising an input/output port linked to a processing unit such as a processor, and at least one slave electronic card addressable by the processing unit, characterized in that an address cue comprising a first address indication (A8–A11) making it possible to locate the slave card on the bus as well as a second address indication (A0–A7) defining an addressing space within the slave card, is associated with every slave electronic card, in that the process comprises at least write access cycles and read access cycles, in the course of which the following are conveyed in the guise of monitoring logic signals; an access logic signal (/BAE) representative of an access or nonaccess in read or write mode to the bus, an enabling logic signal (LAS) allowing enabling of the second address indications, this enabling logic signal being active at the high logic level throughout the duration of write or read access, and a selection logic signal (/BSEL) activated by the slave card having recognized its address cue.

6. Process according to claim 5, characterized in that it furthermore comprises a step (140) of so-called resetting of the slave cards performed in the presence of a reset logic signal (/RESET) emitted by the master electronic card.

7. Process according to claim 5, characterized in that an identifier representative of a card type chosen from among predefined types is stored in certain at least of the slave cards and in that the process comprises a step (142) of automatic identification by the master card, of the type of each slave card connected on a base card, and a step (143) of automatic assignment by the master card to each identified slave card of its first address indication (A8–A11) making it possible to locate it on the bus.

8. Process according to claim 5, characterized in that it comprises a step of transferring information between the master card and a slave card according to a so-called direct memory access mode controlled by three logic signals (/DPEQ, /DACK, /DONE) managed by the master card.

9. Process according to claim 5, characterized in that the clock inputs of the address decoding logic circuits installed on the slave cards are controlled directly on the rising edges of the enabling logic signal (LAS).

10. Process according to claim 5, for exchanging information between a master electronic card comprising an input/output port linked to a master processing unit such as a master processor and at least one slave electronic card addressable by the processing unit and comprising a slave processing unit such as a slave processor, characterized in that the master card is permitted to send simultaneous requests to several slave cards but to receive a cue originating from only one slave card at a time, and in that the mutual exclusion of the slave cards as regards the sending of their cues to the master card is managed within management logic means (DCD) installed directly on the slave cards.

11. Process according to claim 6, characterized in that a slave card intended to be identified automatically is equipped with an internal logic unit able to deliver in series a predetermined number of bits forming the said identifier, in that after the reset step (140), the said slave card sequentially transmits toward the master card the bits of its identifier by using the selection logic signal (/BSEL), and in that the master card then transmits to the slave card a predetermined number of address bits (@) constituting the said first address indication.

12. Process according to claim 7, characterized in that when several slave cards are connected in parallel on one or more base cards, the master card identifies and addresses the slave cards sequentially in a pre-established order.

13. Process according to claim 10, characterized in that the management logic means (DCD) comprise a programmable logic circuit, the clock input (CLCK) of which is controlled on the falling edge of the enabling logic signal (LAS) in the presence of predetermined conditions.

14. Process according to claim 11, characterized in that each slave card intended to be identified automatically is equipped with an initialization input able to receive an initialization input logic signal (/SIN), and with an initialization output able to deliver an initialization output logic signal (/SOUT), in that the initialization input of the first slave card is linked to the master card, and the initialization output of each slave card is linked to the initialization input of the next slave card in the said pre-established order, in that a card receiving an inactive initialization input logic signal (/SIN) ignores any cue flowing on the bus, in that at the termination of the reset step, the initialization output logic signals (/SOUT) of all the slave cards are inactive while only the initialization input logic signal (/SIN) of the first slave card is active, and in that at the termination of the identification step (142) and of the address assignment step (143) which are performed for a current slave card, the initialization output logic signal (/SOUT) delivered by this card becomes active allowing the identification and address assignment of the next slave card (K=K+1).

15. System for connection between electronic cards, characterized in that it comprises at least one base card (CB) comprising a printed circuit (CI) possessing a set of tracks (PST) for transferring electrical signals, at least two base connectors (CO2–CO5) connected on the said set of tracks and each able removably to receive one of the said electronic cards (CEL), signal amplification means (U1–U3) connected on the printed circuit, and individual electrical supply means connected on the printed circuit and able to supply the amplification means and the said electronic cards;

wherein the base card further comprises first and second complementary extension connectors (CO1, CO6) connected on the said set of tracks and arranged on either side of the amplification means, the first extension connector of the base card being able to cooperate removably with a second extension connector on another base card while the second extension connector of the base card is able to cooperate removably with a first extension connector of another base card.

16. System according to claim 15, characterized in that the base card comprises more than two base connectors (CO2–CO5), all connected in parallel on the said set of tracks, the amplification means being arranged between two of the base connectors (CO2, CO3).

17. System according to claim 15, characterized in that the two extension connectors (CO1, CO6) are arranged transversely in the vicinity of two opposite ends of the base card (CB).

18. System according to claim 15, characterized in that the printed circuit is a double-faced circuit, the set of tracks (PST), the connectors (CO1–CO6) and the amplification means (U1–U3) being situated exclusively on one of the faces while the other face comprises other tracks forming a ground plane.

19. System according to claim 15, for exchanging information between a master electronic card comprising an input/output port linked to a processing unit such as a processor, and at least one slave electronic card addressable by the processing unit, characterized in that the said set of tracks forms a hardware support for a digital linking bus conveying, synchronously, data logic signals (ADi), address logic signals (ADi), as well as monitoring logic signals, with the exclusion of any clock logic signal.

20. System according to one of claim 15, characterized in that it comprises, for each base card, a package (BT) incorporating the base card (CB) equipped with the amplification means and the connectors, as well as the supply means connected to the printed circuit.

21. System according to claim 17, characterized in that the base card comprises at the level of the tracks of the printed circuit groups of transverse rows of connection holes, each group being able to receive pins of a base connector or extension connector, the transverse rows of one and the same group being mutually spaced longitudinally by a distance equal to an integer multiple of a predetermined spacing pitch (p), in that two adjacent rows belonging respectively to two neighboring groups assigned to two base connectors are spaced apart by an integer multiple of the said spacing pitch while two adjacent rows belonging to two neighboring groups respectively assigned to a base connector and to an extension connector are spaced apart by a distance (d1) equal to one and a half times the spacing pitch (p).

22. System according to claim 19, characterized in that the amplification means comprise a first bidirectional amplification circuit (U1) able to amplify the data signals and a part of the address signals, and possessing a control input terminal (DIR) for defining the direction of travel of the signals through this first circuit, a bidirectional programmable logic circuit (U2) able to amplify a part of the control signals and an output terminal (19) of which is linked to the control input terminal (DIR) of the first amplification circuit (U1), as well as a second monodirectional amplification circuit (U3) able to amplify another part of the address signals and the remaining control signals, in that these three circuits are arranged on the same face of the printed circuit and in that the programmable logic circuit (U2) is arranged between the first bidirectional amplification circuit (U1) and the second monodirectional amplification circuit (U3).

23. System according to claim 20, characterized in that it comprises, for each electronic card (CEL), an interface package (BTL) housing the said electronic card, able to be fixed removably on the package (BT) of the base card to permit the connection between this electronic card (CEL) and the base card (CB).

24. Process for exchanging digital information between electronic cards, characterized in that the electronic cards (CEL) are removably connected on at least one base card (CB) comprising a printed circuit (CI) possessing a set of tracks (PST) forming a hardware support for a digital bus on which are conveyed, synchronously, data logic signals (ADi), address logic signals (ADi), as well as monitoring logic signals, with the exclusion of any c lock logic signal;

wherein said process for exchanging digital information between electronic cards includes exchanging information between a master electronic card comprising an input/output port linked to a processing unit such as a processor, and at least one slave electronic card addressable by the processing unit, characterized in that an address cue comprising a first address indication (A8–A1) making it possible to locate the slave card on the bus as well as a second address indication (A0–A7) defining an addressing space within the slave card, is associated with every slave electronic card, in that the process comprises at least write access cycles and read access cycles, in the course of which the following are conveyed in the guise of monitoring logic signals; an access logic signal (/BAE) representative of an access or nonaccess in read or write mode to the bus, an enabling logic signal (LAS) allowing enabling of the second address indications, this enabling logic signal being active at the high logic level throughout the duration of write or read access, and a selection logic signal (/BSEL) activated by the slave card having recognized its address cue; and a step (140) of so-called resetting of the slave cards performed in the presence of a reset logic signal (/RESET) emitted by the master electronic card.

25. Process according to claim 24, characterized in that a slave card intended to be identified automatically is equipped with an internal logic unit able to deliver in series a predetermined number of bits forming the said identifier, in that after the reset step (140), the said slave card sequentially transmits toward the master card the bits of its identifier by using the selection logic signal (/BSEL), and in that the master card then transmits to the slave card a predetermined number of address bits (@) constituting the said first address indication.

26. Process according to claim 24, wherein clock inputs of the address decoding logic circuits installed on the slave cards are controlled directly on the rising edges of the enabling logic signal (LAS).

27. Process for exchanging digital information between electronic cards, characterized in that the electronic cards (CEL) are removably connected on at least one base card (CB) comprising a printed circuit (CI) possessing a set of tracks (PST) forming a hardware support for a digital bus on which are conveyed, synchronously, data logic signals (ADi), address logic signals (ADi), as well as monitoring logic signals, with the exclusion of any clock logic signal;

wherein said process for exchanging digital information between electronic cards includes exchanging information between a master electronic card comprising an input/output port linked to a processing unit such as a processor, and at least one slave electronic card addressable by the processing unit, characterized in that an address cue comprising a first address indication (A8–A1) making it possible to locate the slave card on the bus as well as a second address indication (A0–A7) defining an addressing space within the slave card, is associated with every slave electronic card, in that the process comprises at least write access cycles and read access cycles, in the course of which the following are conveyed in the guise of monitoring logic signals; an access logic signal (/BAE) representative of an access or nonaccess in read or write mode to the bus, an enabling logic signal (LAS) allowing enabling of the second address indications, this enabling logic signal being active at the high logic level throughout the duration of write or read access, and a selection logic signal (/BSEL) activated by the slave card having recognized its address cue; and wherein an identifier representative of a card type chosen from among predefined types is stored in certain at least of the slave cards and in that the process comprises a step (142) of automatic identification by the master card, and a step (143) of automatic assignment by the master card to each identified slave card of its first address indication (AB-A11) making it possible to locate it on the bus.

28. Process according to claim 27, characterized in that a slave card intended to be identified automatically is equipped with an internal logic unit able to deliver in series a predetermined number of bits forming the said identifier, in that after a reset step (140), the said slave card sequentially transmits toward the master card the bits of its identifier by using the selection logic signal (/BSEL), and in that the master card then transmits to the slave card a predetermined number of address bits (@) constituting the said first address indication.

29. Process according to claim 27, wherein clock inputs of the address decoding logic circuits installed on the slave cards are controlled directly on the rising edges of the enabling logic signal (LAS).

30. Process according to claim 27, wherein information exchange occurs between a master electronic card comprising an input/output port linked to a master processing unit such as a master processor and at least one slave electronic card addressable by the processing unit and comprising a slave processing unit such as a slave processor, characterized in that the master card is permitted to send simultaneous requests to several slave cards but to receive a cue originating from only one slave card at a time, and in that the mutual exclusion of the slave cards as regards the sending of their cues to the master card is managed within management logic means (DCD) installed directly on the slave cards.

31. Process according to claim 30, wherein the management logic means (DCD) comprise a programmable logic circuit, the clock input (CLCK) of which is controlled on the falling edge of the enabling logic signal (LAS) in the presence of predetermined conditions.

* * * * *